(12) United States Patent
Lee et al.

(10) Patent No.: US 10,576,846 B2
(45) Date of Patent: Mar. 3, 2020

(54) RELEASE ACTUATOR FOR VEHICLE SEAT

(71) Applicants: Hyundai Motor Company, Seoul (KR); Daedong Movel System Co., Ltd., Siheung-si (KR); Das Co., Ltd, Gyeongju-si (KR)

(72) Inventors: Sang-Soo Lee, Gunpo-si (KR); Tae-Jun Kwon, Incheon (KR); Young-Dong Kim, Seongnam-si (KR); Sang-Ho Kim, Incheon (KR); Young-Bok Sung, Hwaseong-si (KR); Ji-Hyong Lee, Gyeongju-si (KR); Jae-Hwa Lee, Daegu (KR); Seong-Mun Ju, Gyeongju-si (KR); Yeong-Sik Joo, Siheung-si (KR); Myoung-Soo Chang, Incheon (KR); Yun-Soo Kim, Incheon (KR)

(73) Assignees: Hyundai Motor Company, Seoul (KR); Daedong Movel System Co., Ltd., Siheung-si (KR); Das Co., Ltd., Gyeongju-si (KR)

( * ) Notice: Subject to any disclaimer, the term of this patent is extended or adjusted under 35 U.S.C. 154(b) by 256 days.

(21) Appl. No.: 15/468,578

(22) Filed: Mar. 24, 2017

(65) Prior Publication Data
US 2018/0141470 A1 May 24, 2018

(30) Foreign Application Priority Data
Nov. 18, 2016 (KR) .................. 10-2016-0153752

(51) Int. Cl.
*B60N 2/20* (2006.01)
*B60N 2/30* (2006.01)

(52) U.S. Cl.
CPC .............. *B60N 2/20* (2013.01); *B60N 2/3011* (2013.01); *B60N 2/3056* (2013.01)

(58) Field of Classification Search
CPC .... B60N 2/0232; B60N 2/6673; B60N 2/829; B60N 2/853; B60N 2/166; B60N 2/1871; B60N 2002/0236
See application file for complete search history.

(56) References Cited

U.S. PATENT DOCUMENTS

| 5,813,282 | A | * | 9/1998 | Azuma | ................ | B60J 5/062 |
| | | | | | | 192/48.92 |
| 9,010,860 | B2 | * | 4/2015 | Kume | ................. | B60N 2/90 |
| | | | | | | 297/344.1 |

(Continued)

OTHER PUBLICATIONS

"Internal Gears," Boston Gear, retrieved from internet May 9, 2019, [https://www.bostongear.com/products/open-gearing/stock-gears/spur-gears/internal-gears]<https: www.bostongear.com="" products="" "" open-gearing="" stock-gears="" spur-gears="" internal-gears= "">. <https: www.bostongear.com="" products="" open-gearing=.*

*Primary Examiner* — Richard W Ridley
*Assistant Examiner* — Brian J McGovern
(74) *Attorney, Agent, or Firm* — Slater Matsil, LLP (57) ABSTRACT

A release actuator for a vehicle seat includes a spur gear that is rotatable in one direction or in the other direction by receiving rotational force from a motor, and has sliding grooves that are formed in both surfaces of the spur gear and have a predetermined length. A first cable guide is disposed to face one surface of the spur gear and has a protrusion placed in one of the sliding grooves. The first cable guide is connected to a first cable that withdraws a walk-in latch and releases walk-in lock when the first cable is pulled. A second cable guide is disposed to face the other surface of the spur gear, has a protrusion placed in the other sliding groove, and is connected to a second cable that withdraws a folder lock latch and releases folder lock when the second cable is pulled.

15 Claims, 8 Drawing Sheets

(56) References Cited

U.S. PATENT DOCUMENTS

| | | | | |
|---|---|---|---|---|
| 9,850,994 | B2* | 12/2017 | Schena | B25J 9/1045 |
| 2003/0227203 | A1* | 12/2003 | Mundell | A47C 7/465 |
| | | | | 297/284.4 |
| 2008/0264197 | A1* | 10/2008 | Shahana | B62M 9/12 |
| | | | | 74/502.2 |
| 2009/0079240 | A1* | 3/2009 | Bach | B60N 2/3011 |
| | | | | 297/217.3 |
| 2010/0259120 | A1* | 10/2010 | Karaki | B60N 2/0232 |
| | | | | 310/83 |
| 2016/0281400 | A1* | 9/2016 | Byun | E05B 79/20 |

\* cited by examiner

FIG 1a

FOLDING WALK-IN

ARC-SHAPED PORTION

FIG 7

< ROTATED CLOCKWISE >

< ROTATED COUNTERCLOCKWISE >

FIG 8

RELEASE ACTUATOR FOR VEHICLE SEAT

CROSS-REFERENCE TO RELATED APPLICATIONS

This application claims priority under 35 U.S.C. § 119 to Korean Patent Application No. 10-2016-0153752, filed on Nov. 18, 2016, in the Korean Intellectual Property Office, the disclosure of which is incorporated herein by reference in its entirety.

TECHNICAL FIELD

The present invention relates to a release actuator for a vehicle seat.

BACKGROUND

Figure 1A:
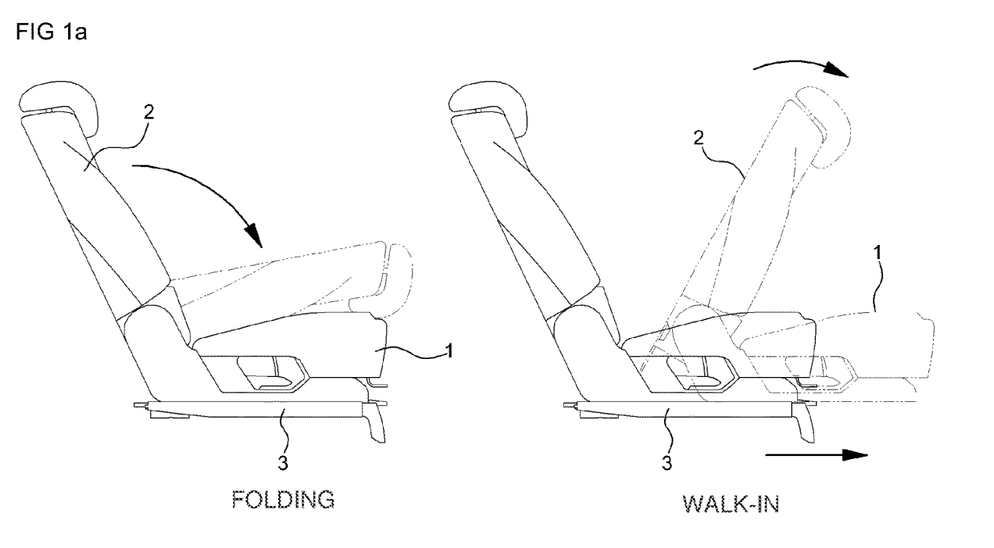
FIG. 1A is a view illustrating states in which a seat is in a folded position and a walk-in position.

In a vehicle such as a sport utility vehicle (SUV) and a recreation vehicle (RV) in which seats are mounted in three or more rows, as illustrated in FIG. 1A, a seat in the second row is configured to have a walk-in function of tilting a seatback 2 of the seat forward and sliding an entire seat cushion 1 forward in order to allow a passenger to easily get into the rear side and get into or out of a rear seat, and a folding function of rotating the seatback 2 forward in order to load goods into the vehicle.

Figure 1B:
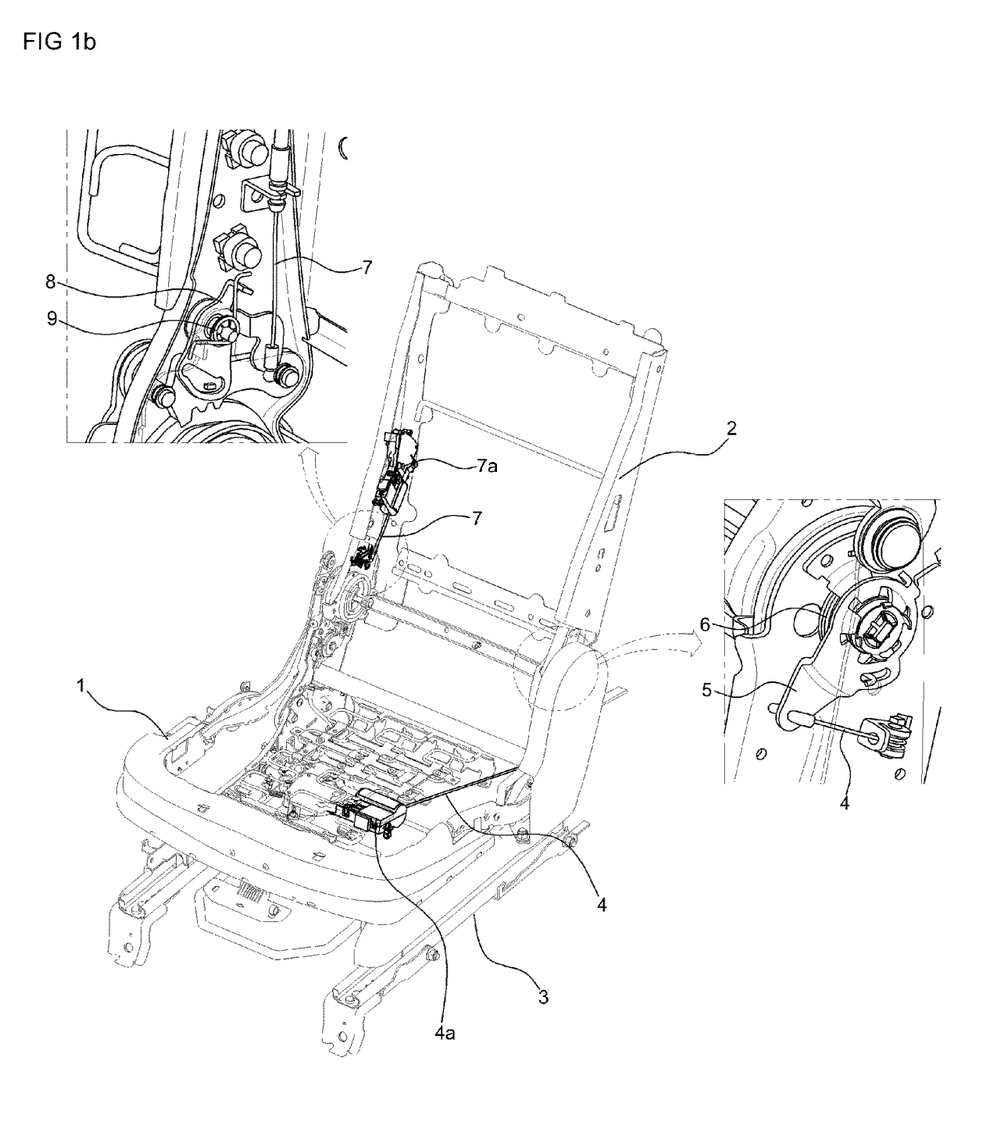
FIG. 1B is a view illustrating a seat structure in the related art.
Figure 2:
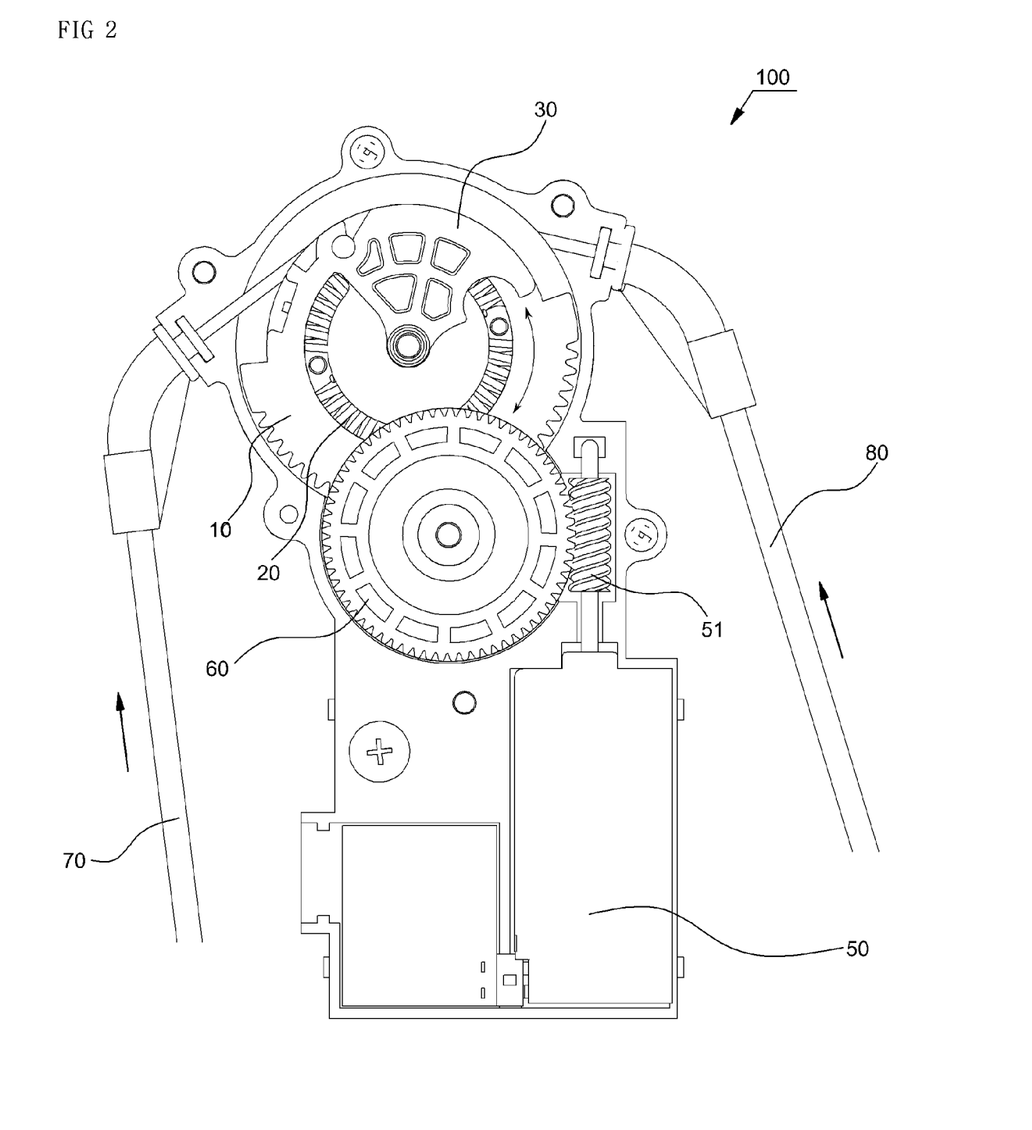
FIG. 2 is a view illustrating an appearance of a release actuator for a vehicle seat according to an exemplary embodiment of the present invention.

To enable the functions, a typical seat in the second row is configured such that the seat cushion 1 may slide forward and rearward on a seat rail 3, and the seatback 2 may be tilted forward or rearward. Further, when the sliding operation of the seat cushion 1 and the tilting operation of the seatback 2 are completed, a sliding position and a tilting position of the seat cushion 1 and the seatback 2 are fixed as a walk-in latch 5 and a folder lock latch 8 are locked as illustrated in FIG. 1B.

That is, the walk-in latch 5 and the folder lock latch 8 are embedded in the seat, and after the walk-in latch 5 and the folder lock latch 8 are released, the seatback 2 may be tilted and the seat cushion 1 may be slid (for reference, based on the configuration of the seat, the walk-in latch may be configured to operate in conjunction with the folder lock latch so as to simultaneously release the folder lock latch and a separate latch that inhibits the seat cushion from sliding on the seat rail, or the walk-in latch may be configured to operate independently of the folder lock latch, and the walk-in latch mentioned herein means a device for simultaneously locking and unlocking the tilting operation of the seatback and the sliding operation of the seat cushion). The walk-in latch 5 and the folder lock latch 8 are connected to cables 4 and 7, respectively, and the cables 7 and 4 are individually connected to a folder lock release actuator 7a and a walk-in lock release actuator 4a, respectively.

Therefore, when a user intends to use the walk-in or folding function, the user unlocks the walk-in or folding function by pushing a switch that operates one of the actuators 4a and 7a, and then slides or tilts the seat after the cable pulls one of the latches. Further, after the switch is released, the walk-in latch 5 and the folder lock latch 8 return back to the locked state by elastic force of springs 6 and 9.

Meanwhile, in the structure in the related art, the cables 7 and 4 are individually connected to the folder lock release actuator 7a and the walk-in lock release actuator 4a, respectively, and as a result, there is a problem in that production costs are increased, and an internal structure of the seat is complicated, which causes deterioration in assembly properties.

SUMMARY

Embodiments of the present invention relate to a release actuator for a vehicle seat that selectively releases one of two latches in order to perform a walk-in or folding operation of the vehicle seat. Embodiments have been made in an effort to provide a release actuator for a vehicle seat, which is installed as a single actuator and may selectively operate a first cable connected with a walk-in latch or a second cable connected with a folder lock latch, to avoid problems that arise when the folder lock release actuator and the walk-in lock release actuator are separately installed.

An exemplary embodiment of the present invention provides a release actuator for a vehicle seat. The release actuator includes a spur gear that is rotatable in one direction or in the other direction by receiving rotational force from a motor, and has sliding grooves that are formed in both surfaces of the spur gear and have a predetermined length. A first cable guide is disposed to face one surface of the spur gear and has a protrusion placed in one of the sliding grooves. The first cable guide is connected to a first cable that withdraws a walk-in latch and releases walk-in lock when the first cable is pulled. A second cable guide is disposed to face the other surface of the spur gear, has a protrusion placed in the other sliding groove, and is connected to a second cable that withdraws a folder lock latch and releases folder lock when the second cable is pulled. When the spur gear rotates in one direction, the first cable guide rotates in a state in which the protrusion is in direct contact with a sidewall of the sliding groove so that the first cable is pulled, and the second cable guide is not rotated (because no rotational force is applied to the second cable guide). When the spur gear rotates in the other direction, the second cable guide rotates in a state in which the protrusion is in direct contact with a sidewall of the sliding groove so that the second cable is pulled, and the first cable guide is not rotated (because no rotational force is applied to the first cable guide).

The spur gear may be coupled with a spring so that the spur gear returns back to an initial position by elastic force when electric power being applied to the motor is cut off after the spur gear is rotated.

Two springs may be disposed, and the two springs may be mounted to be embedded in two mounting holes, respectively, one for each groove, which are formed in the spur gear so as to be symmetrical to each other with a rotation axis therebetween, and have an arc shape.

The spur gear may have an arc-shaped portion which has no gear tooth at a circumference thereof and has an arc-shaped flat surface, and the sliding grooves may be formed in the arc-shaped portion.

The first cable guide and the second cable guide may have the same rotation axis as the spur gear.

A worm may be coupled to a rotating shaft of the motor, a worm wheel may be gear-connected to the spur gear, and the worm may mesh with the worm wheel so as to rotate the worm wheel.

A reduction ratio between the motor and the spur gear may be set to 1/150 to 1/200.

The worm and the worm wheel may be configured such that the worm wheel rotates to rotate the worm. That is, the reverse rotation is permitted.

According to the present invention, since the single release actuator is installed and may be substituted for the folder lock release actuator and the walk-in lock release actuator, it is possible to reduce production costs of the seat, and to improve assembly properties because the internal structure of the seat is simplified.

The motor and the spur gear are connected to each other by the worm gear, thereby implementing a great reduction ratio. That is, since the output is increased by adjusting the gear reduction ratio, a motor having a smaller capacity may be used.

DETAILED DESCRIPTION OF ILLUSTRATIVE EMBODIMENTS

Hereinafter, the present invention will be described in detail with reference to the accompanying drawings so that those skilled in the technical field to which the present invention pertains may easily carry out the exemplary embodiment. However, the present invention may be implemented in various different ways, and is not limited to the exemplary embodiments described herein.

A part irrelevant to the description will be omitted to clearly describe the present invention, and the same or similar constituent elements will be designated by the same reference numerals throughout the specification.

Terms or words used in the specification and the claims should not be interpreted as being limited to a general or dictionary meaning and should be interpreted as a meaning and a concept which conform to the technical spirit of the present invention based on a principle that an inventor can appropriately define a concept of a term in order to describe his/her own invention by the best method.

Referring to the drawings, a release actuator 100 for a vehicle seat of the present invention is configured to be able to selectively operate (pull by a predetermined length) a first cable 70 which releases walk-in lock based on a rotation direction of a motor 50, and a second cable 80 which releases folder lock.

The release actuator 100 for a vehicle seat includes the motor 50 which may rotate forward and reversely by receiving electric power, a spur gear 10 which receives rotational force through the motor 50, a spring 20 which is embedded between the spur gear 10 and a spur gear cover 14, and a first cable guide 30 and a second cable guide 40 which may rotate along with the rotation of the spur gear 10.

Figure 4:
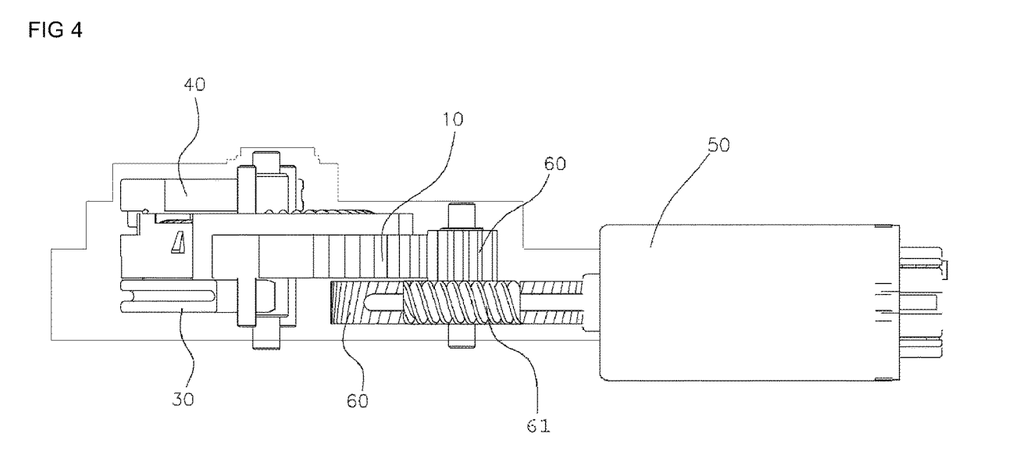
FIG. 4 is a view illustrating a lateral appearance of the release actuator in FIG. 2 (by penetrating a case).
Figure 5:
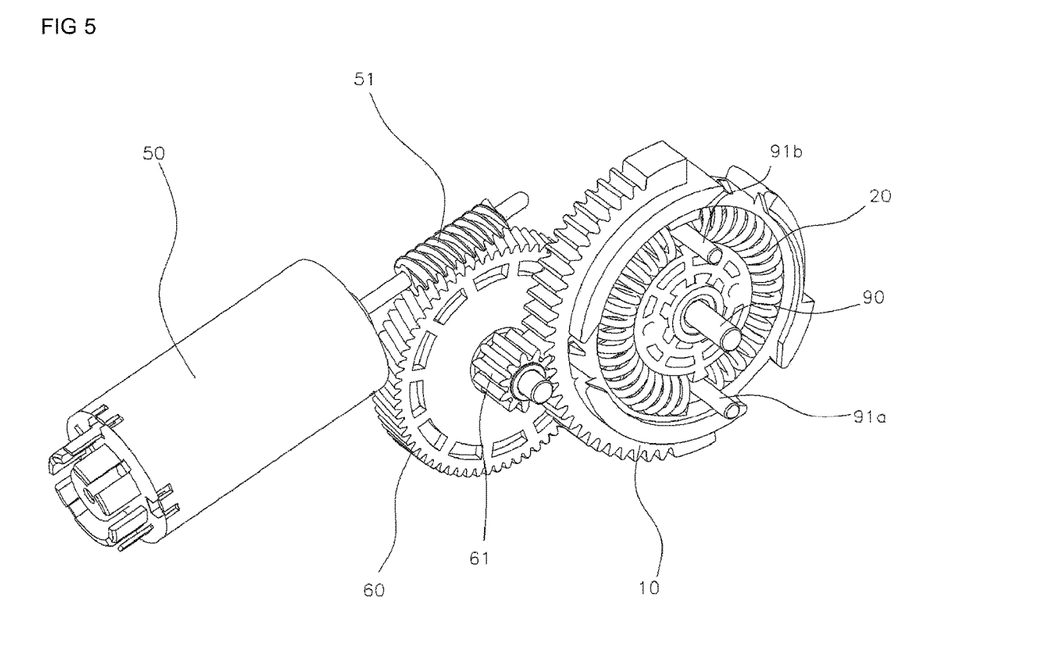
FIG. 5 is an enlarged view of coupling portions among a motor, a worm wheel, and a spur gear in the release actuator in FIG. 2.

A worm 51 is coupled to a rotating shaft of the motor 50, and the worm 51 is connected with a worm wheel 60. As illustrated in FIGS. 4 and 5, a pinion 61 protrudes from one surface of the worm wheel 60, and the pinion 61 meshes with the spur gear 10. Further, in the present invention, a reduction ratio between the motor 50 and the spur gear 10 is set in a range from about 1/150 to about 1/200.

The worm 51 and the worm wheel 60 may rotate reversely so that the worm wheel 60 may rotate the worm 51. That is, rotational force of the worm wheel 60 may rotate the worm 51 by setting friction angles, lead angles, and frictional coefficients of the worm 51 and the worm wheel 60, and because the setting condition is known in publicly known technologies, a detailed setting condition will be omitted.

The spur gear 10 may be rotated about a center pin 90, which is fixed in the case of the release actuator 100, by receiving rotational force from the worm wheel 60. The spur gear 10 has two arc-shaped mounting holes 11 which are symmetrical to each other with the center pin 90, a rotation axis, between the mounting holes 11, and the single spring 20 is embedded in each of the mounting holes 11.

When electric power being applied to the motor 50 is cut off after the spur gear 10 is rotated, the spring 20 serves to return the spur gear 10 back to the initial position by elastic force, and one end of the spring 20 is supported by support pins 91a and 91b fixed on the case. Further, the spur gear cover 14 is coupled to one surface of the spur gear 10 in order to prevent withdrawal of the spring 20.

Therefore, the spur gear 10 may rotate in one direction and the other direction by receiving rotational force from the motor 50, and sliding grooves 12 and 13 having a predetermined length are formed in both surfaces of the spur gear 10, respectively.

The spur gear 10 has an arc-shaped portion which has no gear tooth at a circumference thereof and has an arc-shaped flat surface, and the sliding grooves 12 and 13 are formed in the arc-shaped portion.

Figure 6:
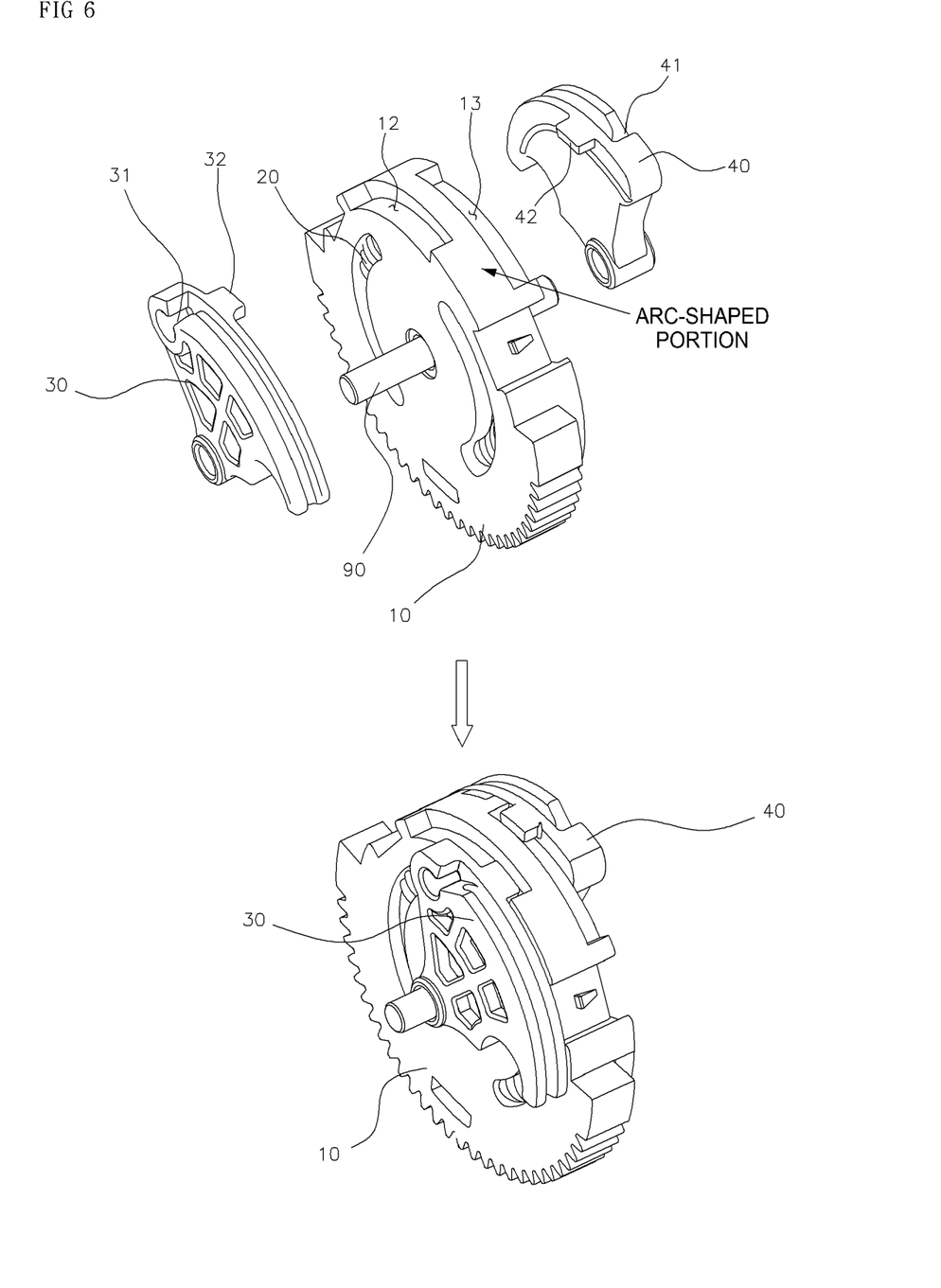
FIG. 6 is a view illustrating states before and after a first cable guide and a second cable guide are coupled to both surfaces of the spur gear, respectively.

The first cable guide 30 and the second cable guide 40 are coupled to one surface and the other surface of the spur gear 10, respectively, as illustrated in FIG. 6. The first cable guide 30 and the second cable guide 40 are configured to be rotated by being fitted with the center pin 90, and have a structure in which protrusions 32 and 42 to be fitted into the sliding grooves 12 and 13 are formed.

Figure 3:
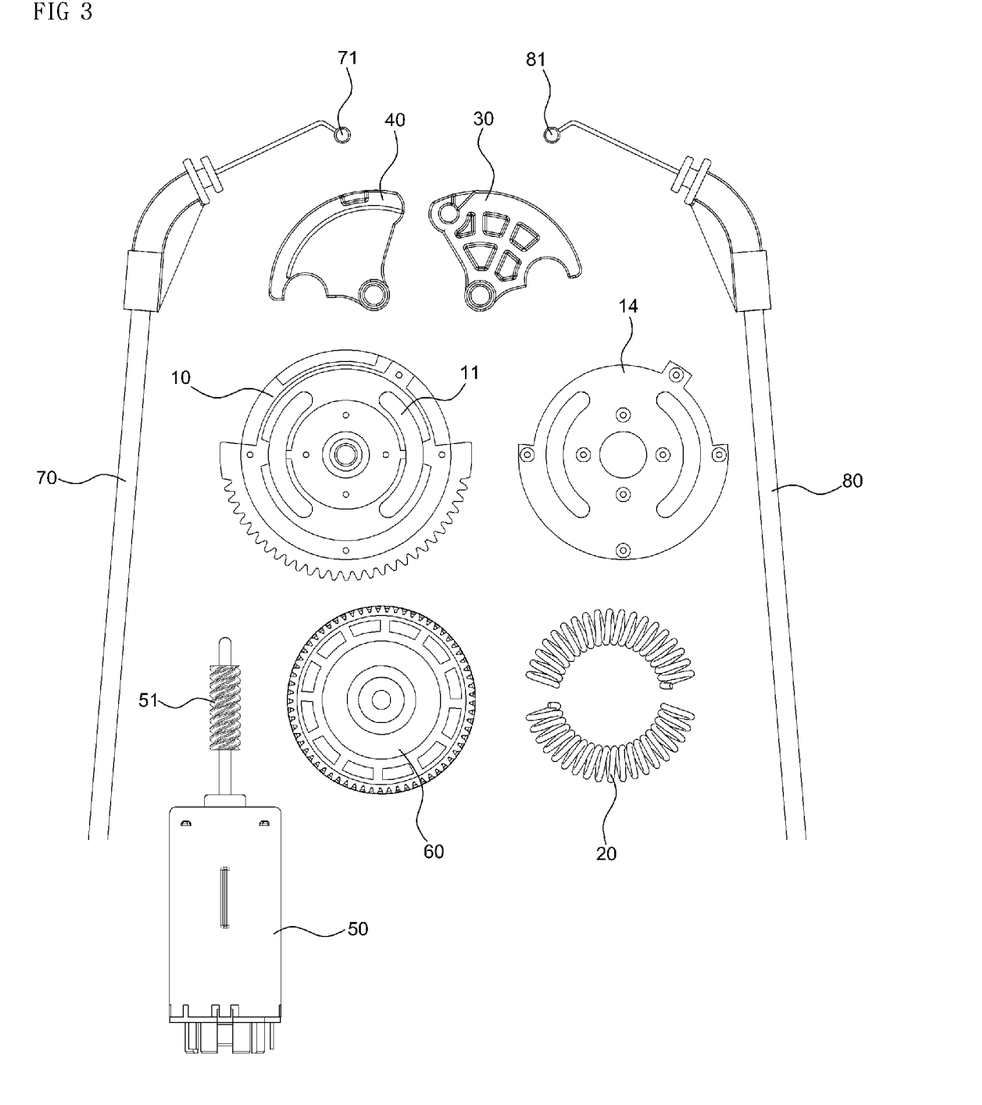
FIG. 3 is a view illustrating a state in which the release actuator in FIG. 2 is disassembled.

The first cable guide 30 is connected to the first cable 70 which withdraws the walk-in latch and releases the walk-in lock when the first cable 70 is pulled, and the second cable guide 40 is connected to the second cable 80 which withdraws the folder lock latch and releases the folder lock when the second cable 80 is pulled. That is, as illustrated in FIG. 3, heads 71 and 81 are connected to ends of the first cable 70 and the second cable 80, respectively, and the heads 71 and 81 are fitted and coupled into grooves 31 and 41 of the first cable guide 30 and the second cable guide 40, respectively.

In the present invention, the sliding grooves 12 and 13 have sufficient lengths equal to or greater than distances by which the first cable 70 and the second cable 80 are pulled, and the protrusions 32 and 42 of the first cable guide 30 and the second cable guide 40 are positioned to be adjacent to sidewalls at one end of each of the sliding grooves 12 and 13 in a state in which the protrusions 32 and 42 are positioned in an initial neutral state (both of the first cable and the second cable are not pulled), as illustrated in the lower part of FIG. 6.

Figure 7:
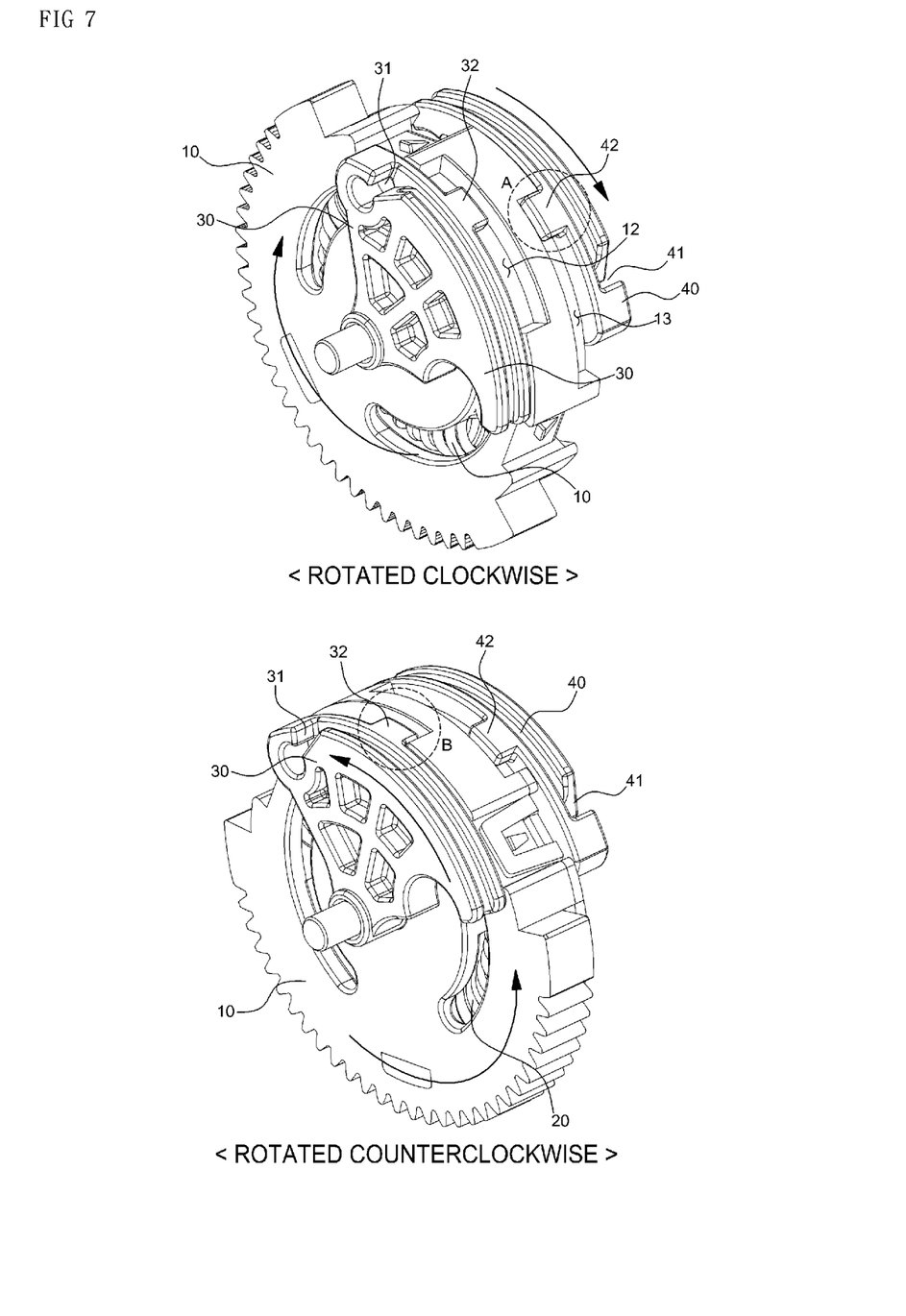
FIG. 7 is a view illustrating states in which the first cable guide and the second cable guide are rotated when the spur gear rotates clockwise and counterclockwise.

When the occupant manipulates the switch installed in an interior of a vehicle body, electric power is applied to the motor 50, and the spur gear 10 rotates clockwise as illustrated in FIG. 7, and as a result, the second cable guide 40 rotates, in a state in which the protrusion 42 is in direct contact with the sidewall of the sliding groove 13 and the protrusion 42 is pressed against the sidewall of the sliding groove 13, so that the second cable 80 is pulled (see part A). In this case, since no pressing force is applied to the first cable guide 30, the first cable guide 30 is not rotated. Therefore, when the spur gear 10 rotates clockwise, the walk-in latch is maintained in the locked state, but the folder lock latch is unlocked.

Likewise, when the spur gear 10 rotates counterclockwise, the first cable guide 30 rotates, in a state in which the protrusion 32 is in direct contact with the sidewall of the sliding groove and the protrusion 32 is pressed against the sidewall of the sliding groove, so that the first cable 70 is pulled (see part B), but because no pressing force is applied to the second cable guide 40, the second cable guide 40 is not rotated. In this case, the walk-in latch is unlocked, and the folder lock latch is maintained in the locked state.

When electric power being applied to the motor 50 is cut off after the first cable guide 30 or the second cable guide 40 is rotated as described above, the worm 51 and the worm wheel 60 may be rotated reversely, and elastic force of the spring 20 is applied, and as a result, the first cable guide 30 or the second cable guide 40, together with the spur gear 10, return back to the original position (a state illustrated in the lower part in FIG. 6).

For reference, in the present invention, the worm gear structure is selected to obtain a great reduction ratio, but other gear structures such as a planetary gear and an internal gear that may obtain a similar reduction ratio may be adopted, and a predetermined amount of grease may be additionally applied between the gear teeth in order to allow the gears to smoothly move, and to reduce noise.

Figure 8:
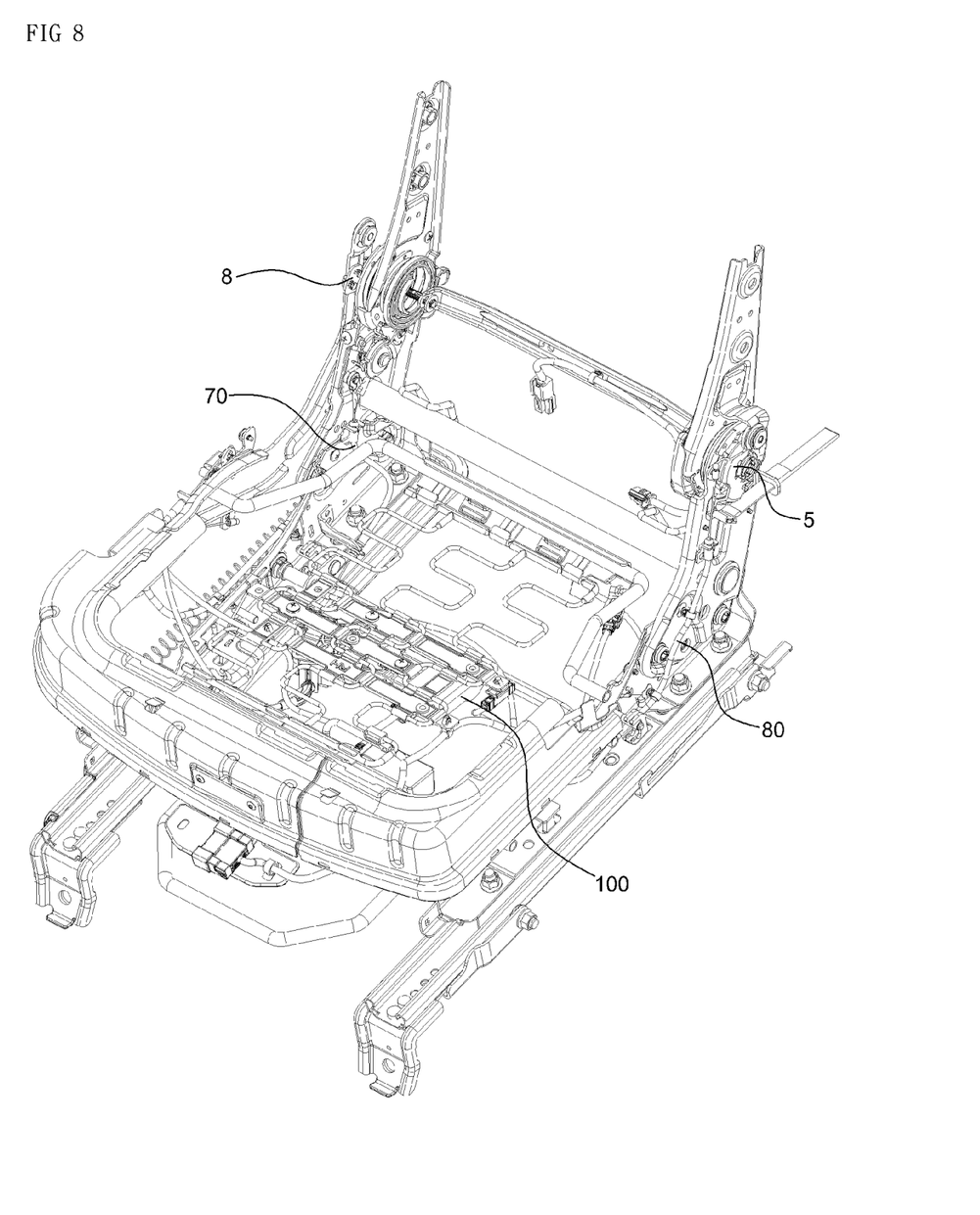
FIG. 8 is a view illustrating a state in which a single release actuator for a vehicle seat of the present invention is mounted in a seat.

The release actuator 100 for a vehicle seat according to the present invention, which is configured as described above, is advantageous in that the single release actuator may control two functions of the seat by adjusting the rotation direction of the motor 50 based on an electrical signal from the switch, as illustrated in FIG. 8. That is, since the release actuator of the present invention may be substituted for the folder lock release actuator and the walk-in lock release actuator in the related art, it is possible to reduce production costs of the seat, and to improve assembly properties because the internal structure of the seat is simplified.

The motor 50 and the spur gear 10 are connected to each other by the worm gear (a primary speed reduction is implemented between the worm and the worm wheel, and a secondary speed reduction is implemented between the pinion of the worm wheel and the spur gear), thereby implementing a great reduction ratio. That is, the output is increased by adjusting the gear reduction ratio, such that a motor having a smaller capacity may be used.

The present invention, which has been described above, is not limited by the aforementioned exemplary embodiment and the accompanying drawings, and it is obvious to those skilled in the art to which the present invention pertains that various substitutions, modifications and alterations may be made without departing from the technical spirit of the present invention.

What is claimed is:

1. A release actuator for a vehicle seat, the release actuator comprising:
   a spur gear that is rotatable in a first direction or in a second direction opposite the first direction upon receipt of a rotational force from a motor,
   the spur gear has a first sliding groove formed in a first surface, the first sliding groove having a first sidewall and a second sidewall;
   the spur gear has a second sliding groove formed in a second surface, the second sliding groove having a first sidewall and a second sidewall;
   the spur gear has gear teeth formed around a first portion of an exterior circumference of the spur gear, the gear teeth being separated from at least one of the first and second sidewalls of the first sliding groove;
   a first cable guide facing the first surface of the spur gear, the first cable guide having a first protrusion placed in the first sliding groove and being connected to a first cable that withdraws a walk-in latch and releases a walk-in lock when the first cable is pulled; and
   a second cable guide facing the second surface of the spur gear, the second cable guide having a second protrusion placed in the second sliding groove of the spur gear and being connected to a second cable that withdraws a folder lock latch and releases a folder lock when the second cable is pulled;
   wherein the release actuator is configured so that
      when the spur gear rotates in the first direction, the first cable guide rotates in a state in which the first protrusion is in direct contact with one of the first and second sidewalls of the first sliding groove so that the first cable is pulled, and the second cable guide is not rotated; and
      when the spur gear rotates in the second direction, the second cable guide rotates in a state in which the second protrusion is in direct contact with one of the first and second sidewalls of the second sliding groove so that the second cable is pulled, and the first cable guide is not rotated.

2. The release actuator of claim 1, wherein the spur gear is coupled with a spring so that the spur gear returns back to an initial position by elastic force when electric power being applied to the motor is cut off after the spur gear is rotated.

3. The release actuator of claim 2, wherein the spring includes a first spring that is mounted to be embedded in a first mounting hole and a second spring that is mounted to be embedded in a second mounting hole, the first mounting hole being associated with the first sliding groove and the second mounting hole being associated with the second sliding groove, the first and second mounting holes each having a respective arc shape, the first and second mounting holes being formed in the spur gear so as to be symmetrical to each other with a rotation axis therebetween.

4. The release actuator of claim 1, wherein the spur gear has an arc-shaped second portion at the exterior circumference, the arc-shaped second portion has no gear teeth, and wherein the first and second sliding grooves are formed in the arc-shaped second portion.

5. The release actuator of claim 1, wherein the spur gear, the first cable guide and the second cable guide have a common rotation axis.

6. The release actuator of claim 1, wherein a reduction ratio between the motor and the spur gear is set to 1/150 to 1/200.

7. The release actuator of claim 1, further comprising a worm coupled to a rotating shaft of the motor and a worm wheel gear connected to the spur gear, a pinion protrudes from the worm wheel and contacts the gear teeth of the spur gear, wherein the worm and the worm wheel are configured to rotate relative to one another.

8. A method of operating a release actuator for a vehicle seat, wherein the release actuator comprises:
- a spur gear that is rotatable in a first direction or in a second direction opposite the first direction upon receipt of a rotational force from a motor,
- the spur gear has a first sliding groove formed in a first surface, the first sliding groove having a first sidewall and a second sidewall;
- the spur gear has a second sliding groove formed in a second surface, the second sliding groove having a first sidewall and a second sidewall;
- the spur gear has gear teeth formed around a first portion of an exterior circumference of the spur gear, the gear teeth separated from at least one of the first and second sidewalls of the first sliding groove;
- a first cable guide facing the first surface of the spur gear, the first cable guide having a first protrusion placed in the first sliding groove and being connected to a first cable that withdraws a walk-in latch and releases a walk-in lock when the first cable is pulled; and
- a second cable guide facing the second surface of the spur gear, the second cable guide having a second protrusion placed in the second sliding groove of the spur gear and being connected to a second cable that withdraws a folder lock latch and releases a folder lock when the second cable is pulled;
- wherein the method comprises:
  - rotating the spur gear in the first direction so that the first cable guide rotates in a state in which the first protrusion is in direct contact with one of the first and second sidewalls of the first sliding groove so that the first cable is pulled, and the second cable guide is not rotated; and
  - rotating the spur gear in the second direction so that the second cable guide rotates in a state in which the second protrusion is in direct contact with one of the first and second sidewalls of the second sliding groove so that the second cable is pulled, and the first cable guide is not rotated.

9. The method of claim 8, wherein rotating the spur gear comprises applying the rotational force from the motor and wherein the spur gear is coupled with a spring so that the spur gear returns back to an initial position by elastic force when electric power being applied to the motor is cut off after the spur gear is rotated.

10. The method of claim 9, wherein the spring includes a first spring mounted to be embedded in a first mounting hole and a second spring mounted to be embedded in a second mounting hole, the first mounting hole being associated with the first sliding groove and the second mounting hole being associated with the second sliding groove, the first and second mounting holes each having a respective arc shape, the first and second mounting holes being formed in the spur gear so as to be symmetrical to each other with a rotation axis therebetween.

11. The method of claim 8, wherein the spur gear has an arc-shaped second portion at the exterior circumference, the arc-shaped second portion has no gear teeth, and wherein the first and second sliding grooves are formed in the arc-shaped second portion.

12. The method of claim 8, wherein the spur gear, the first cable guide and the second cable guide have a common rotation axis.

13. The method of claim 8, wherein rotating the spur gear comprises applying the rotational force from the motor, wherein the release actuator further comprises a worm coupled to a rotating shaft of the motor and a worm wheel gear-connected to the spur gear, and wherein the worm meshes with the worm wheel so as to cause the worm wheel to rotate.

14. The method of claim 13, wherein a reduction ratio between the motor and the spur gear is set to 1/150 to 1/200.

15. The method of claim 8, wherein rotating the spur gear comprises applying the rotational force from the motor, wherein the release actuator further comprises a worm coupled to a rotating shaft of the motor and a worm wheel gear-connected to the spur gear, and wherein the worm and the worm wheel are configured such that the worm wheel rotates to cause the worm to rotate.

* * * * *